P. W. GATES.
COMBINATION JOLT RAMMING AND SQUEEZING MACHINE.
APPLICATION FILED APR. 17, 1917.
1,381,912. Patented June 21, 1921.
2 SHEETS—SHEET 1.
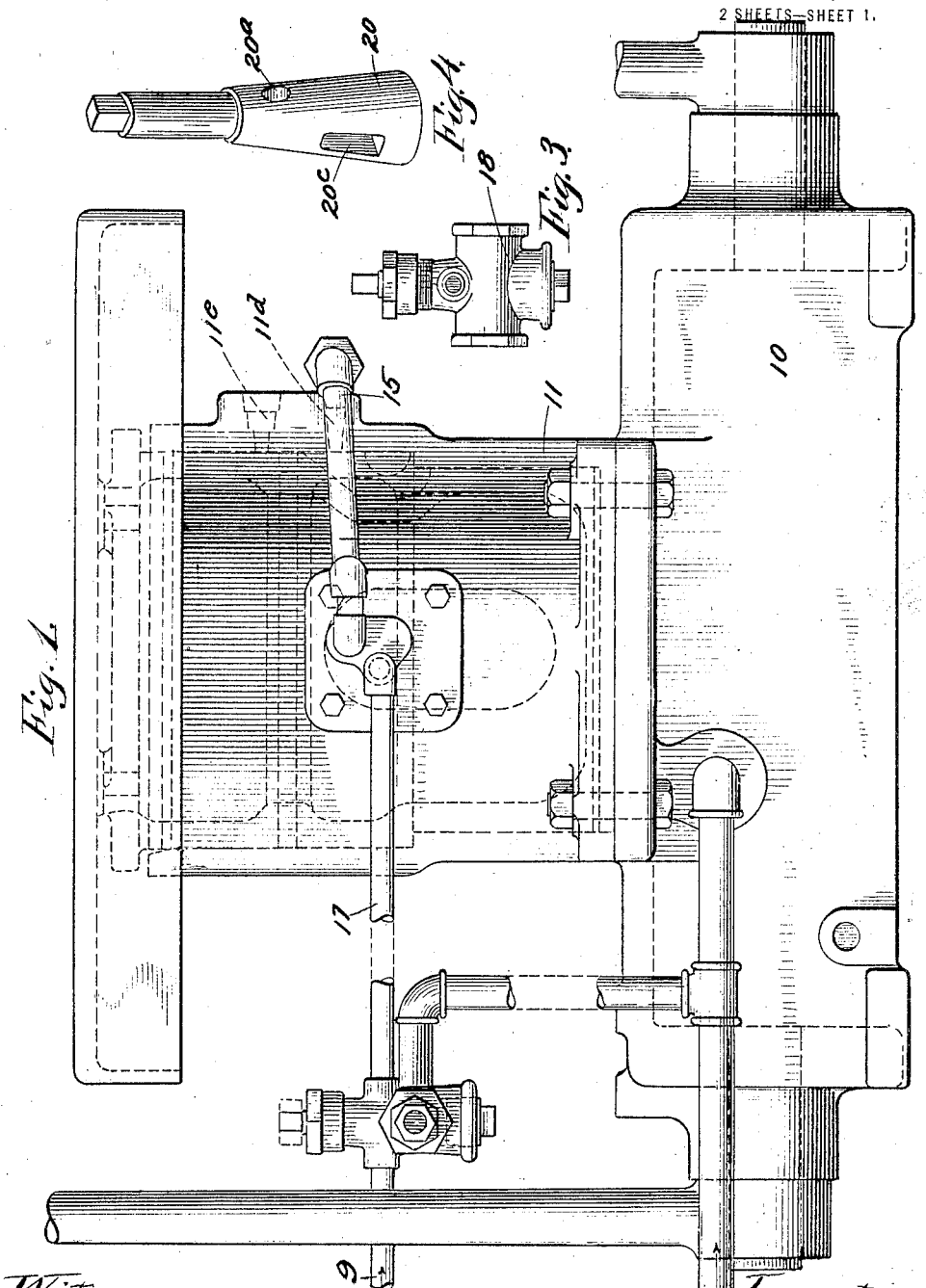
Witness:
C. C. Burnap
Inventor:
Philetus W. Gates
By Sheridan, Scott & Sheridan, Attys

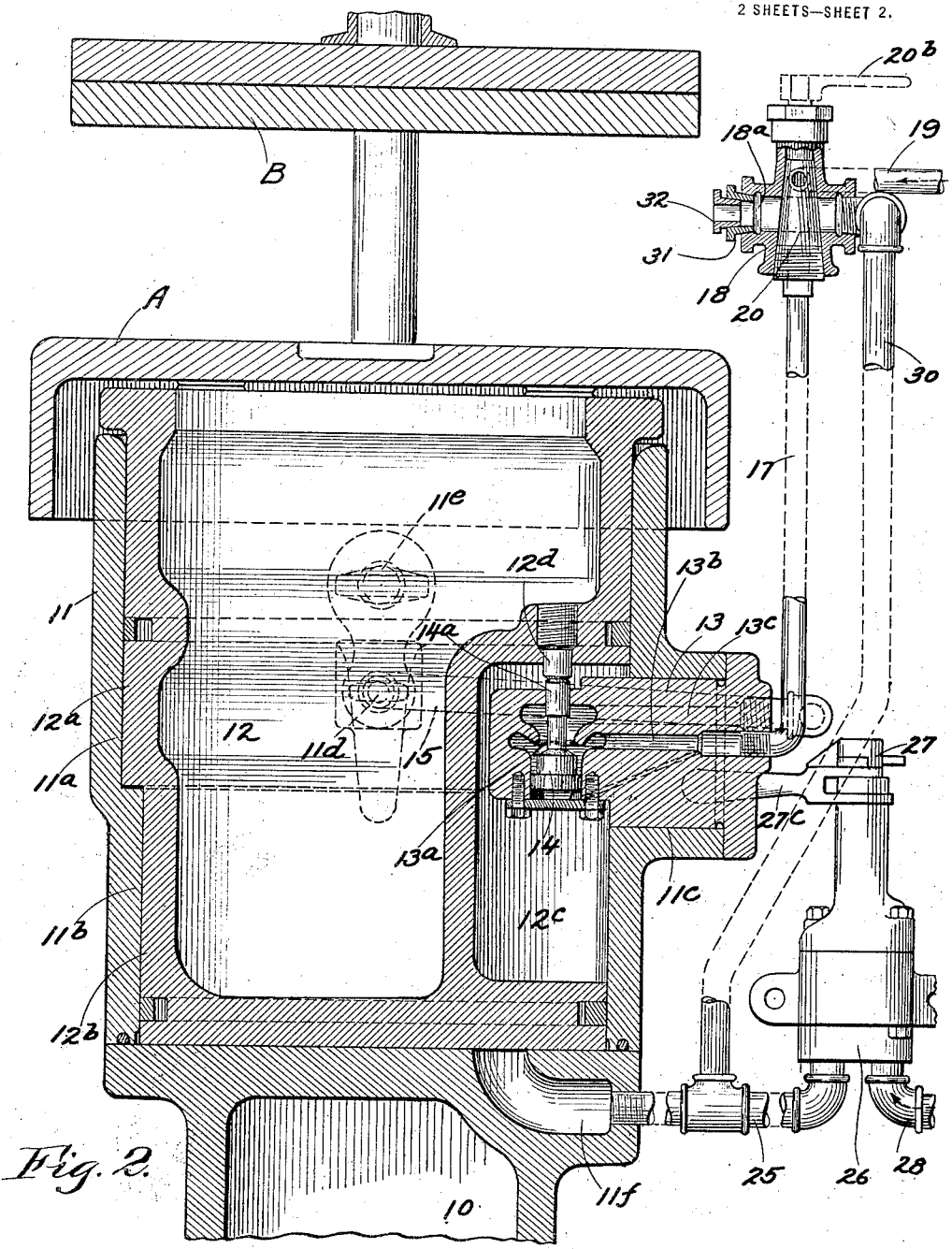

UNITED STATES PATENT OFFICE.

PHILETUS W. GATES, OF CHICAGO, ILLINOIS, ASSIGNOR TO MUMFORD MOLDING MACHINE COMPANY, A CORPORATION OF NEW JERSEY.

COMBINATION JOLT RAMMING AND SQUEEZING MACHINE.

1,381,912.  Specification of Letters Patent.  Patented June 21, 1921.

Application filed April 17, 1917. Serial No. 162,627.

*To all whom it may concern:*

Be it known that I, PHILETUS W. GATES, a citizen of the United States, residing at Chicago, in the county of Cook and State of Illinois, have invented certain new and useful Improvements in Combination Jolt Ramming and Squeezing Machines, of which the following is a specification.

This invention relates to improvements in combination jolt ramming and squeezing machines for molding and has for its object to provide means for regulating the quality of the jolt and means to eliminate vacuum beneath the squeezing plunger during jolt ramming operations.

This invention is an improvement upon that set forth in the co-pending application of Wm. P. Krause, filed in the United States Patent Office March 29, 1917, Serial No. 158,413.

Other objects will be set forth and made apparent in the following specification and be shown in the accompanying drawings, in which—

Figure 1 is a rear elevation of a portion of my machine.

Fig. 2 is a vertical transverse section therethrough.

Fig. 3 is a detail of the casing of the valve for controlling the supply of air to the jolt valve; and Fig. 4 is a perspective of the valve plug coacting with the casing shown in Fig. 3.

Like numerals refer to like elements throughout the drawings, in which 10 indicates the base of the machine to which is bolted the upstanding cylinder 11 having the enlarged upper portion $11^a$ and reduced lower portion $11^b$. Within this cylinder is reciprocably mounted the piston or plunger 12 having the enlarged upper portion $12^a$ and reduced lower portion $12^b$ closely fitting and sliding in the portions $11^a$ and $11^b$, respectively, of the cylinder 11. The cylinder 11 is apertured at $11^c$ to permit the insertion therethrough of the flanged jolt valve block 13 which projects into a recess $12^c$ in the plunger 12. Mounted in the valve block 13 is the valve 14 coacting with the seat $13^a$ and having a stem portion $14^a$ projecting upwardly through the block 13. Located above the stem $14^a$ is the striker pin $12^d$ carried by the plunger 12 and operable on the downward movement of the plunger 12 to contact with the valve stem $14^a$ to move the valve 14 to open position, as shown in Fig. 2. The valve block 13 is further provided with an inlet passage $13^b$ and an outlet duct $13^c$ which communicates with a pipe or tube 15 leading to the inlet $11^d$ in the upper portion of the cylinder wall 11. Located above the inlet $11^d$ is the cylinder outlet $11^e$. Leading to the duct $13^b$ is the supply pipe 17 from the valve casing 18, to which leads and with which communicates the fluid supply pipe 19. A tapered plug valve 20 is rotatably mounted in the valve casing 18 and is provided with a transverse duct or aperture $20^a$ serving, when in proper position, to furnish communication between pipes 19 and 17 to permit the flow of actuating fluid to the valve block 13 for jolting. The specific jolting and valve-controlling mechanism is not a part of this invention and needs no further description herein beyond the statement that when the valve plug 20, through the medium of the operating handle $20^b$, is moved to position wherein flow of actuating fluid will take place through tube 17, the valve 14 will automatically actuate in conjunction with the plunger 12 to effect the necessary raising and dropping of the latter to permit it to jolt on the bottom of the cylinder so long as the valve 20 is in open position.

For squeezing, the valve 20 is moved to closed position, valve 27 is opened so that air is admitted through inlet $11^f$ in the base 10 to the bottom of the cylinder 11 to positively lift the plunger 12, so that the table A carried thereby may be lifted to effect pressing of a mold against the presser-head B. The actuating fluid is conveyed through inlet $11^f$ from the pipe 25 which leads from valve casing 26, in which is mounted a conventional two-way or two-position valve having a stem 27 operable by an operating handle $27^c$ to move said valve to either of two positions. A fluid supply duct 28 leads to the casing 26. The valve therein, as stated, is of conventional type and needs no description herein beyond mentioning that movement of the handle $27^c$ to one position will permit the actuating fluid to flow flow through pipe 25. When the valve is moved to the second position, such flow is cut off and the air beneath the piston $12^b$ is allowed to exhaust through inlet $11^f$, pipe 25, and through the valve casing 26 to the outside atmosphere.

A duct or pipe 30 leads from and communicates with the pipe 25 to and communicates with the valve casing 18, the latter being also provided with an outlet 18$^a$ opposite point of communication of the duct 30, said outlet being interiorly threaded. The valve plug 20 is provided with a cross aperture or duct 20$^c$ serving in one position of the valve 20 to permit flow of fluid between duct 30 and outlet 18$^a$. This aperture 20$^c$ is so related to aperture 20$^a$ that said last-named flow will be prevented when valve 20 is in position cutting off communication between supply pipe 19 and pipe 17. In other words, when the supply of actuating fluid for jolting is cut off by valve 20 flow through tube or duct 30 is prevented.

I have found that the quality of the impact during jolting operations may be varied according to the load carried by and the weight of the plunger 12, by varying the size of the outlet ducts which control the escape and influx of air from and to the cylinder 11 beneath the piston 12. Were no outlet provided, during the jolting operation a vacuum would be present beneath the piston 12 and the machine would not function as a jolting machine. This vacuum would be partially overcome by opening communication between the pipe 25 and the outside atmosphere through casing 26, but such communication is not sufficient to totally destroy the vacuum mentioned above and the efficiency and proper functioning of the jolt-ramming mechanism is interfered with. It might seem to the casual observer that by increasing the size of the outlet through casing 26 free flow of air beneath the squeezing portion of the plunger would result so as not to interfere with the jolt-ramming operation. In the event, however, that this outlet were so increased it would be of such size and function that the plunger and table, together with the load carried by the latter, would drop too quickly after the squeezing operation and the result would be to damage or injure molds after the squeezing thereof. It is impractical at the same time to regulate the exhaust after the squeezing operation through the medium of the valve, since the ordinary molder works so quickly and with such disregard of valve regulation that it is practically necessary to provide a valve which is thrown to its limit of travel in either direction, such limit being indicated by the use of suitable stops. To overcome this interference with the jolting, and permit regulation of the quality of the jolt, I have provided the tube 30 and coacting outlet 18$^a$.

It will be apparent from the above description that when jolting is taking place the air drawn into the cylinder beneath piston 12$^b$ by the upward movement of the latter and discharged by the downward movement thereof will flow through the pipe 25 to and from the outside atmosphere through pipe 30, and, by inserting apertured bushings 31, 32 of different sizes in the threaded outlet 18$^a$, I am able to effectually control the quality of the jolt by regulating the size of the outlet 18$^a$, through which a portion of the entrapped air from beneath the piston 12 is discharged. In short, I have provided an auxiliary supply and discharge duct communicating with the portion of the cylinder beneath the plunger, and have provided means to vary the outlet through said duct to permit regulation or adjustment of the jolting impact.

It will be obvious that other methods of controlling the flow of air to and from beneath the squeezing portion of the plunger may be substituted for the form shown and described herein; and I do not wish to be restricted to such showing or description except as defined in the appended claims.

What I claim is:—

1. In combination, a cylinder, a plunger reciprocably mounted therein, said cylinder and plunger having coacting jolting portions and coacting squeezing portions, a duct to supply actuating fluid to said jolting portion of said cylinder, a second duct to supply actuating fluid to said squeezing portion of said cylinder and a third duct to permit flow of relief air to and from said squeezing cylinder during jolt ramming, a valve to open and close said second duct, and a valve to open said first and third-named ducts simultaneously and to close said first and third-named ducts simultaneously.

2. In combination, a cylinder, a plunger reciprocably mounted therein, said plunger and cylinder being provided with coacting jolting portions and coacting squeezing portions, means to provide actuating fluid to said jolting portion of said cylinder, and a relief duct to permit flow of relief air to and from said squeeze cylinder during jolt ramming, said duct being provided with bushing members of different outlet diameters to permit regulation of the flow of air therethrough to thereby regulate the quality of jolting impact.

In testimony whereof, I have subscribed my name.

PHILETUS W. GATES.

Witnesses:
R. H. WOODLAND,
R. TROSSEN.